United States Patent
Fransson

(10) Patent No.: US 8,130,311 B2
(45) Date of Patent: Mar. 6, 2012

(54) METHOD OF CAPTURING AN IMAGE WITH A MOBILE DEVICE

(75) Inventor: Johan Nils Fransson, Solna (SE)

(73) Assignee: Sony Ericsson Mobile Communications AB, Lund (SE)

( * ) Notice: Subject to any disclaimer, the term of this patent is extended or adjusted under 35 U.S.C. 154(b) by 735 days.

(21) Appl. No.: 12/051,210

(22) Filed: Mar. 19, 2008

(65) Prior Publication Data

US 2009/0207301 A1    Aug. 20, 2009

Related U.S. Application Data

(60) Provisional application No. 61/028,602, filed on Feb. 14, 2008.

(51) Int. Cl.
*H04N 5/222* (2006.01)
*H04N 5/235* (2006.01)

(52) U.S. Cl. .................................. 348/371; 348/362

(58) Field of Classification Search ................... None
See application file for complete search history.

(56) References Cited

U.S. PATENT DOCUMENTS

| | | | |
|---|---|---|---|
| 6,684,028 B2 | 1/2004 | Shimada | |
| 7,085,489 B2* | 8/2006 | Yamashita | 396/157 |
| 7,209,170 B2* | 4/2007 | Nishino et al. | 348/371 |
| 7,414,666 B2* | 8/2008 | Yamaguchi | 348/371 |
| 7,697,062 B2* | 4/2010 | Wernersson | 348/371 |
| 7,835,639 B2* | 11/2010 | Murakami et al. | 348/371 |
| 2002/0191102 A1 | 12/2002 | Yuyama et al. | |
| 2007/0133974 A1* | 6/2007 | Murakami et al. | 396/157 |
| 2009/0103609 A1* | 4/2009 | Jiang et al. | 375/240.03 |

FOREIGN PATENT DOCUMENTS

| | | |
|---|---|---|
| EP | 1 387 562 A2 | 2/2004 |
| WO | WO 97/36427 | 10/1997 |
| WO | WO 2006/016366 | 2/2006 |
| WO | WO 2006/085834 A1 | 8/2006 |

* cited by examiner

*Primary Examiner* — Luong T Nguyen
(74) *Attorney, Agent, or Firm* — Harrity & Harrity, LLP

(57) ABSTRACT

A mobile device including an image capturing unit, a flash unit and a control unit. The control unit may initiate the image capturing unit to capture an image with activating the flash unit.

25 Claims, 6 Drawing Sheets

METHOD OF CAPTURING AN IMAGE WITH A MOBILE DEVICE

CROSS-REFERENCE TO RELATED APPLICATIONS

This application claims priority under 35 U.S.C. §119 based on U.S. provisional application No. 61/028,602, filed Feb. 14, 2008, the disclosure of which is incorporated by reference herein its entirety.

BACKGROUND OF THE INVENTION

The present invention generally relates to mobile devices, such as cellular phones, cameras, etc. and, more particularly to capturing an image with a mobile device.

In recent years, mobile devices are increasingly equipped with built-in image-capturing functions. An example of such a device is a camera phone, which combines a cellular telephone with a camera. Other examples include personal data assistants (PDAs), or portable computers, or the mobile device may itself be a camera. To take a picture of a scene in low or poor lighting conditions, these mobile devices are often equipped with a flash unit. The flash unit illuminates the scene in front of the camera lens of the mobile device, and allows the mobile device to record an image with a shorter exposure time.

In some circumstances, a person being photographed with such a mobile device may be disturbed by the activation of the flash unit. In particular, the person may be dazzled if the flash is lit for too long. There are also instances where a light emitting diode (LED) flash will be used, and such an LED flash may overheat and may potentially be damaged if the flash pulse time is too long. There are also eye safety regulations in place, and using longer flash pulse times may bring the energy irradiated into the eye of a person being photographed closer to such safety regulation thresholds.

For obtaining a good low light performance of a camera, it is beneficial to use long exposure times, which may result in long flash pulse times. Further, when taking the picture, the camera will, for example, adjust the auto exposure (AE) and the automatic white balance (AWB), for which a certain number of frames have to be acquired. The acquisition of these frames, in particular, when using long exposure times, results in the flash unit being activated for a long period of time. For the above-mentioned reasons, such a long activation of a flash unit is undesirable. A need exists for a method of taking a flash photograph which does not suffer from such drawbacks.

SUMMARY OF THE INVENTION

According to an embodiment of the present invention, a method of capturing an image with a mobile device comprising an image capturing unit and a flash unit is provided. The method includes operating the image capturing unit in a flash mode at an operating frame rate. Using a frame rate faster than the operating frame rate, initial frames are captured. Further, at least one image frame is captured. During the capturing of the initial frames and the capturing of the at least one image frame, the flash unit is activated. With such a method, the time the flash unit is required to be activated is reduced.

In accordance with another embodiment of the present invention, an exposure target on the basis of which an exposure is adjusted for capturing a frame, is different for the initial frames and the at least one image frame. For example, the exposure target for the initial frames may be smaller than the exposure target for the image frame by a predetermined factor. Said factor may correspond to a ratio of the initial frame rate to the operating frame rate. In another embodiment, said factor is used in determining an exposure time for said capturing of said at least one image frame. An advantage of this embodiment is that even when acquiring the initial frames at the faster initial frame rate, the initial frames may be used for determining an exposure time for said at least one image frame.

In accordance with another embodiment of the present invention, a method for capturing an image with a mobile device comprising an image capturing unit and a flash unit, the image capturing unit being operable with a predetermined exposure target for capturing an image frame, is provided. The method includes capturing initial frames using the exposure target decreased by a predetermined factor. On the basis of the initial frames, an exposure parameter can then be determined. Taking the determined exposure parameter into account, which may be adjusted based on said factor, at least one image frame is captured. During the capturing of the initial frames and the capturing of the at least one image frame, the flash unit is activated. In a further embodiment, the camera unit is operated in a flash mode at an operating frame rate, and the initial frames are captured at an initial frame rate faster than said operating frame rate.

In accordance with another embodiment of the present invention, a mobile device with an image capturing unit capable of capturing frames with at least two different frame rates is provided. The image capturing unit is capable of operating in flash mode at an operating frame rate. The mobile device is provided with a flash unit. The mobile device further comprises a control unit, which is configured to initiate the image capturing unit to capture initial frames at an initial frame rate higher than said operating frame rate and to capture at least one image frame. The control unit is further configured to activate the flash unit during the capturing of the initial frames and during the capturing of the at least one image frame. A mobile device according to the present embodiment allows a reduction of the flash pulse time. In another embodiment, the control unit is further configured so as to operate said image capturing unit with an exposure target for capturing an image frame. For capturing the initial frames, the image capturing unit is operated with the exposure target decreased by a predetermined factor. The flash unit may comprise at least one light emitting diode.

According to yet another embodiment of the invention, a cellular phone with an integrated camera is provided. The cellular phone comprises an image capturing unit capable of capturing frames with at least two different frame rates, the image capturing unit being capable of operating in a flash mode at an operating frame rate. The cellular phone further comprises a flash unit. A control unit of the cellular phone is configured to initiate said image capturing unit to capture initial frames at an initial frame rate higher than said operating frame rate and to capture at least one image frame. The control unit is further configured to activate the flash unit during the capturing of the initial frames and during the capturing of the at least one image frame.

The foregoing and other features and advantages of the invention will become further apparent from the following detailed description read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE INVENTION

Figure 1:
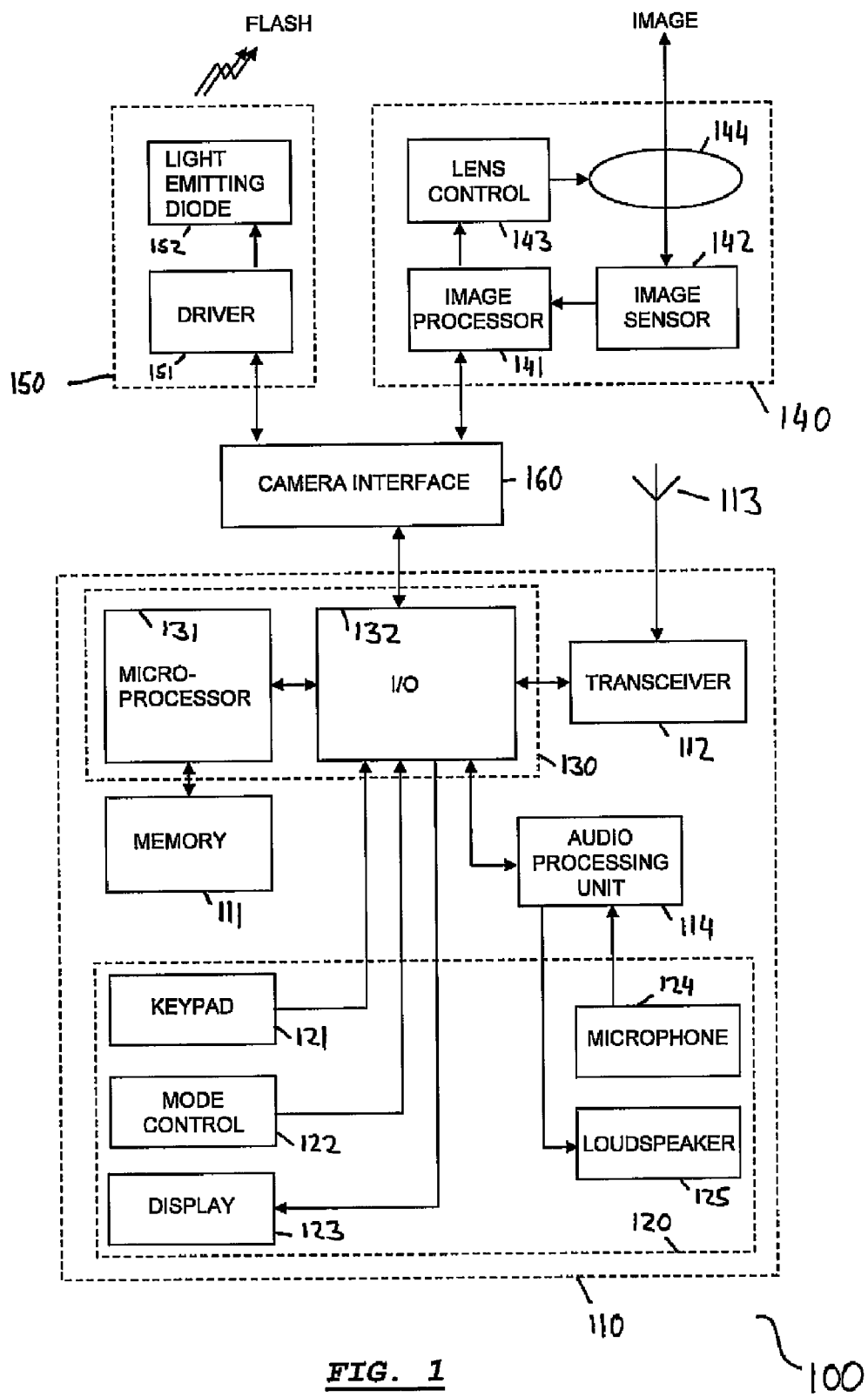
FIG. 1 is a schematic diagram of a mobile device according to an embodiment of the invention.

FIG. 1 shows a mobile device 100 for capturing an image according to an embodiment of the invention. Using the exemplary block diagram of FIG. 1, the general operations of mobile device 100 will be described. A component 110 may include a user interface 120 and a control unit 130.

Control unit 130 may include a microprocessor 131 and an input/output (I/O) unit 132. Component 110 may include a memory 111 in communication with microprocessor 131, and a transceiver 112 in communication with I/O unit 132.

Transceiver 112 may be coupled to an antenna 113 for receiving and transmitting signals. Transceiver 112 may, for example, be operational to communicate with cellular network base stations, i.e., it may be a fully functional cellular radio transceiver. Transceiver 112 may operate according to any known standard. Standards according to which transceiver 112 may operate include, the global system for mobile communications (GSM), UMTS, TEA/EIA-136, cdmaOne, cdma2000, GPRS, and Wideband CDMA.

The operation of mobile device 100 may be controlled by microprocessor 131. Microprocessor 131 may execute programs stored in a memory 111. Microprocessor 131 may have the form of a single microprocessor, or multiple microprocessors, and may include general purpose or special purpose microprocessors and digital signal processors.

Memory 111 may include several types of memory used in mobile device 100, such as random access memory (RAM), read only memory (ROM), and other non-volatile memory, such as flash memory and the like. Non-volatile memory may also include EPROM or EEPROM, and may be provided internal to mobile device 100, or in removable form, such as a memory card, or in a combination thereof.

I/O unit 132 may interface microprocessor 131, transceiver 112, and user interface 120. User interface 120 may include a keypad 121, a mode control 122, a display 123, a microphone 124, and a loudspeaker 125.

Display 123 may be used to display information, function menus, and the like, to a user of mobile device 100. Display information may comprise a picture or image, call status, service information, contact information, Internet related information, dialed digits, and the like. Keypad 121 may include alphanumeric keys, menu keys and other control elements, such as a joystick-like control element, a rotary switch, a rocker, and similar elements. A user may use keypad 121 to bring up a menu on display 123, select and execute functions, dial a telephone number, or enter and exit certain operating modes of mobile device 100. Keypad 121 may be implemented as a touchscreen.

Microphone 124 and loudspeaker 125 may interface an audio processing unit 114. Microphone 124 may record a voice signal of a user, and audio processing unit 124 may convert such a signal to a digital signal and provide it to microprocessor 131 through I/O unit 132. For example, a sound signal that is to be provided to a user, such as the voice signal of an incoming call, may be provided directly or by microprocessor 131 to audio processing unit 114 via I/O unit 132.

Audio processing unit 114 may convert such a signal, which is generally available in a digital format, to an analog signal which is then presented via loudspeaker 125. In a case where mobile device 100 is implemented as a mobile communication device, the signal recorded by microphone 124 may for example be used to communicate with another mobile communication device via transceiver 112 and antenna 113, yet it may also be stored, e.g., in memory 111 or used to activate a function via voice control.

Mode control 122 may be used to activate a particular operation mode of mobile device 100. Modes may be a communication mode, a camera mode, an audio player mode, as well as other functions. A mode may be activated by user input received via keypad 121, or it may be activated by other means, such as when removing a coverage from a camera lens provided on mobile device 100, or, in case of a fold-type communication device, by opening the device. A standby mode may also be provided, which may be entered after a certain amount of time has lapsed after the last user input, or directly by user input.

In addition, an image capturing unit in the form of a camera unit 140 and a flash unit 150 may be included in mobile device 100. Camera unit 140 may include an image processor 141, an image sensor 142, and a lens control 143. Lens control 143 may control lens 144, which is shown here as a single lens, may include a plurality of lenses. Lens control 143 may control the position of lens 144 such that an image is focused on an image sensor 142. Lens control 143 may, for example, use an auto focus method for controlling the axial position of lens 144, such that a sharp image is created on image sensor 142. Lens 144 may be a fixed lens. Additionally, an aperture (not shown) may be provided to control the sharpness in the image plane, e.g., behind lens 114.

Image sensor 142 may include a CCD (charge coupled device) or a CMOS (complementary metal oxide semiconductor) image sensor. Image sensor 142 may collect light from the image and convert it to an electrical signal, and this raw image data may be processed by image processor 141.

Image processor 141 may be a conventional digital signal processor programmed to process image data. Using camera interface 160, the image data may be supplied to microprocessor 131 via I/O unit 132 and stored in memory 111, or it may be displayed on display 123. By means of an electrical or wireless connection (not shown), the image data may also be transmitted to another mobile device or a computer system, or it may be sent via transceiver 112 and antenna 113 through a mobile communication network to a receiving unit.

Flash unit 150 may include a driver 151 and one or more light emitting diodes (LEDs) 152. Control signals may be supplied to driver 151 from microprocessor 131 via I/O unit 132 and camera interface 160 and/or driver 151 may also directly interface image processor 141.

In low light situations, such as at night or in a dark room, image sensor 142 may not receive enough light to provide quality image data. In low light situations, exposure time may be increased which may result in camera shake being visible in images leading to motion blur, or sensor gain may be increased resulting in a low signal to noise ratio. If such conditions are detected, camera unit 140 may enter into a flash mode, in which an image is captured by image sensor 142 while light emitting diode 152 is illuminating the scene to be photographed.

Light emitting diode 152 may include a white power LED. Driver 151 may be in the form of a single chip-integrated circuit and may include an external inductor. Driver 151 may include a driver for more than one LED, e.g., a dual LED driver.

Flash unit 150 may be directly activated by image processor 141 when detecting a low light situation and/or it may be activated by microprocessor 131 via I/O unit 132 and camera interface 160. In addition, a lens (not shown) may be provided in front of light emitting diode 152 to focus emitted light, and a reflector may be provided on the opposite side of LED 152, or elsewhere.

In operation, image sensor 142 may acquire images at a prescribed frame rate, the frame rate being based on the existing lighting conditions during operation. In low light conditions, longer exposure times may be needed and thus relatively low frame rates may be used. Image sensor 142 may acquire frames at a rate of five frames per second, for example, resulting in a maximum exposure time of 200 ms, for example.

The acquired frames may be displayed by means of display 123 to a user taking a photograph. By an actuation of a release button, e.g., included in keypad 121, by the user, flash unit 150 may be activated, a predetermined number of images may be acquired using image sensor 142, and exposure parameters may be determined by image processor 141. Using the determined exposure parameters, one or more image frames may then be recorded. After recording of the image frames, flash unit 150 may be deactivated. Image processor 141 may, for example, use an auto exposure loop and/or auto white balance loop to determine exposure parameters.

Mobile device 100 may include other components associated with a mobile device, such as a battery, a subscriber identification module (SIM), e.g., in the form of a SIM card, a data interface for establishing a connection to computer systems and similar components. Mobile device 100 may, for example, have the form of a cellular phone or a Blackberry® communication device.

According to the embodiment of FIG. 1, camera unit 140 of mobile device 100 may be configured to capture frames using at least two different frame rates. The frame rate may generally be defined in units of frames per second (fps). Under low lighting conditions, camera unit 140 may, for example, operate in a flash mode based on an operating frame rate in a range of from about 4 to about 10 fps, for example, in a range of from about 5 to about 7.5 fps. In flash mode, flash unit 150 may be activated when taking a picture, i.e., capturing an image frame using camera unit 140, so that an illumination of the scene to be photographed is achieved.

According to the embodiment, mobile device 100 may be provided with a control unit to control the capturing of frames. In the example of FIG. 1, the control unit may be implemented as image processor 141 and/or as microprocessor 131. The control unit may control camera unit 140 and/or flash unit 150 in such a way that a flash sequence is performed in which a predetermined number of frames is captured at a fast frame rate, while flash unit 150 is activated.

A used herein, "initial frames" may be used to determine exposure parameters and/or other parameters, e.g., using an auto exposure loop or an auto white balance loop. The initial frames may be captured at a frame rate faster than an operating frame rate, e.g., by a factor in a range of from about 2 to about 8 times faster. A factor of about 2, 3, 4, 5, 6, or 7 times (or any fraction thereof) may, for example, be used. If the operating frame rate is 5 or 7.5 fps, the initial frames may, for example, be captured at a frame rate of 15 or 22.5 fps, respectively.

The control unit may initiate the capturing of at least one image frame by camera unit 140, and control the activation of flash unit 150 during the capturing of the at least one image frame. For capturing the image frame, the exposure parameters determined from the initial frames may be used. Further, as the maximum exposure time available when capturing the initial frames at a fast frame rate is decreased, an exposure target set for capturing these frames may also be decreased, so that the exposure target can be reached and an exposure time and/or image sensor gain can be determined. An exposure time determined on the basis of an exposure target decreased by a factor will also be decreased by a corresponding factor, and accordingly, said factor may be accounted for when capturing the at least one image frame. As a result, even though the initial frames are captured at a fast frame rate with a reduced exposure target, an image frame with the desired exposure may be captured by camera unit 140.

As a fast frame rate is used, the whole sequence of capturing the initial frames and the image frame will be shortened, resulting in a reduced time during which flash unit 150 is activated. The reduced flash pulse time is beneficial for persons being photographed, as they will not be excessively disturbed. It is furthermore beneficial for the flash unit, as the risk of overheating and potentially damaging the flash unit is reduced.

As mentioned above, the present invention applies to any mobile device that includes a built-in image capturing unit. Mobile device 100 may be implemented in the form of a personal data assistant (PDA), a personal navigation device (PND) and/or a portable computer. For these applications, transceiver 112 and antenna 113 may, for example, be used for wireless data transfer.

Although beneficial, lens control 143, as well as the audio processing unit 114, microphone 124 and loudspeaker 125 do not need to be provided. In other embodiments, mobile device 100 may itself be a camera, such as a compact camera, a single lens reflex (SLR) camera or a network/web camera. Again, these cameras may not be provided with a transceiver 112 or an antenna 113, and audio processing unit 114, microphone 124 and loudspeaker 125 are also optional.

Mode control 122 may, for example, be used to select different exposure modes, such as shutter priority or aperture priority mode, an auto exposure mode, a flash mode, a setup mode or a viewing mode, in which recorded images may be displayed on display 123. In general, flash unit 150 may be included in a separate unit remote from mobile device 100 and functionally connected thereto. An SLR camera and/or a compact camera may, for example, use an external flash device. Flash unit 150 may also be displaced with respect to a housing of mobile device 100, e.g., from a storage position to a use position. Flash unit 150 may, for example, extend from the housing in a use position to provide a better illumination.

Figures 2A, 2B:
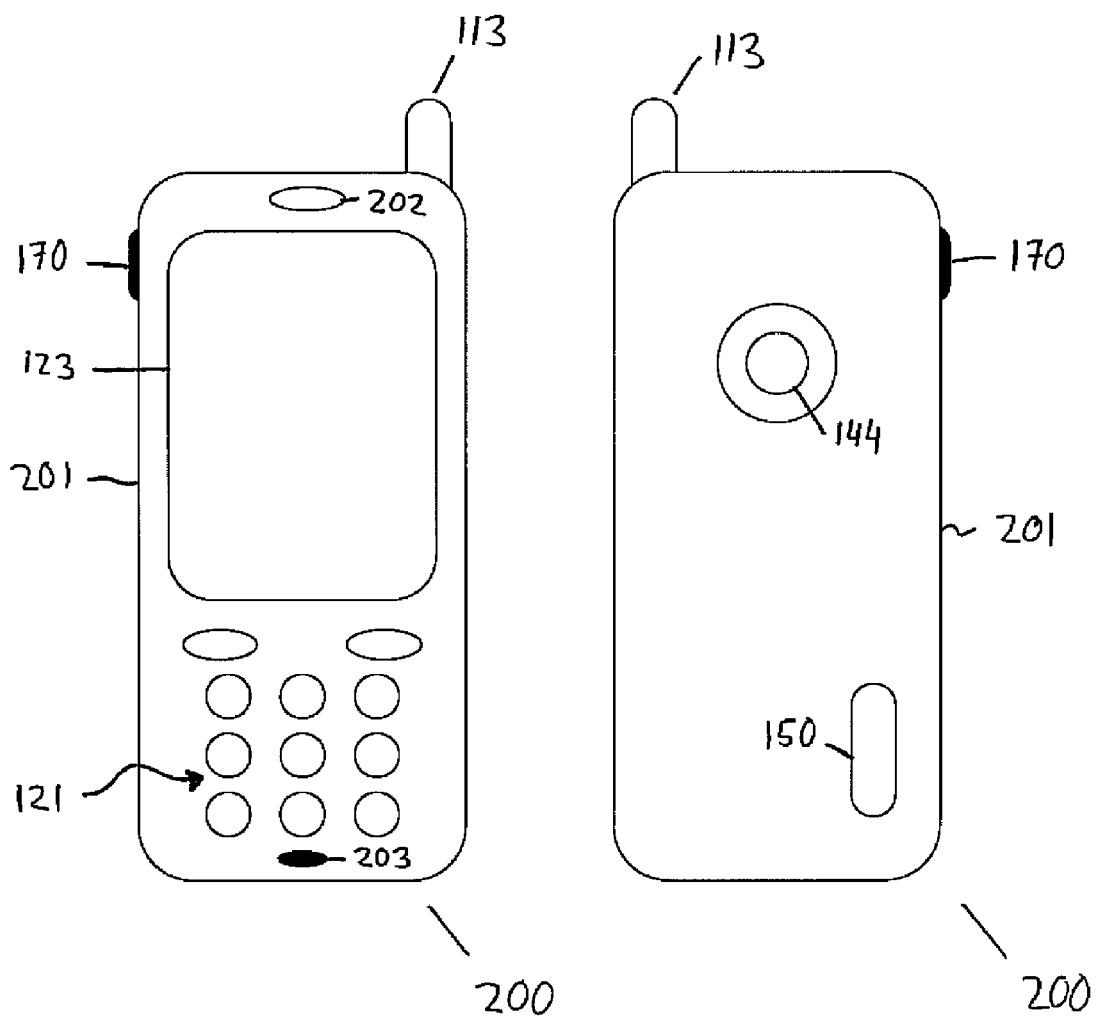
FIGS. 2A and 2B show a cellular phone with an integrated camera according to an embodiment of the invention.

In another embodiment, mobile device 100 may be implemented in the form of a cellular phone with an integrated camera, as shown in FIG. 2. FIG. 2A shows the front face of a cellular phone 200. Cellular phone 200 may include housing 201 with an opening for a loudspeaker 202 and/or an opening for a microphone 203. Keypad 121 may include a plurality of keys, such as alphanumeric keys, and selection keys. Only a few keys are shown here as an example, and keypad 121 may include more control elements, including a joystick-like element, a rocker, a turn-push button and the like. Display 123 may be used to display information, selection menus and the like.

When initiating a call, a user may use keypad 121 to dial in a number of a remote communication device and initiate the call with a function key, in response to which data is sent to a receiving station by antenna 113. The user of the cellular phone may then communicate with the receiving party through microphone 124 and loudspeaker 125 located behind the respective openings 203 and 202. Various functions associated with a cellular phone are known and thus will not be explained in greater detail herein.

By actuating a button of keypad 121, a user may initiate a mode control 122 to change the operation of cellular phone 200 into a camera mode. FIG. 2B shows the backside of cellular phone 200. The backside may include a lens 144 and a flash unit 150. Flash unit 150 may, for example, include one or more light emitting diodes. A removable cover for covering the lens 144 may also be provided.

The user may take a photograph of a scene located in view of lens 144 by pressing release 170 when in camera mode. Release 170 may be part of the keypad 121, and another key, such as a function or alphanumeric key may also be used as a release. In low light situations, cell phone 200 may enter a flash mode, in which flash unit 150 will be used to illuminate the scene when taking a photograph. By implementing the system of FIG. 1 in cellular phone 200, cellular phone 200 may be capable of capturing an image with good exposure while flash unit 150 is activated only during comparatively short periods of time.

Figure 3:
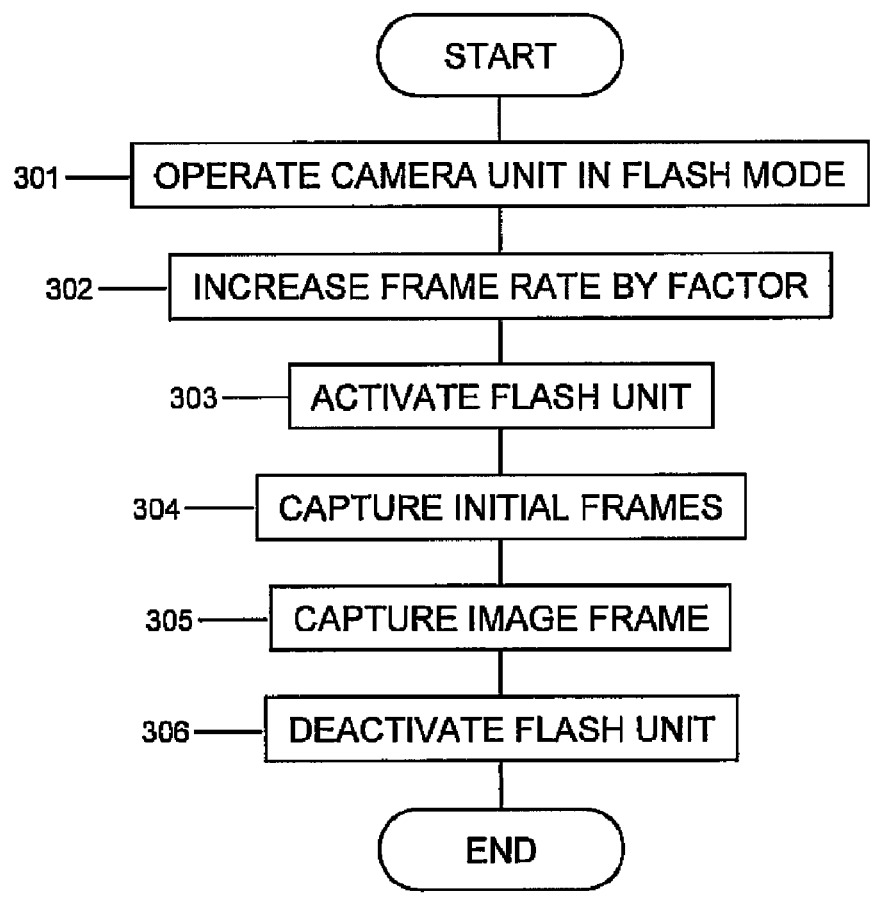
FIG. 3 is a flow chart illustrative of an embodiment of a method of capturing an image with a mobile device.

With respect to FIGS. 3 and 4, another embodiment of a method according to the invention is now described. In a first step 301, the camera unit may be operated in a flash mode. The flash mode may, for example, be entered in low light conditions. The frame capturing rate may generally be relatively slow, as slow exposure times are needed due to the low amount of available light. A frame rate in a range of from about 5 to about 7.5 fps with a corresponding maximum exposure time in a range of about 200 ms to about 132 ms, respectively, for example, may be used.

Figures 4A, 4B:
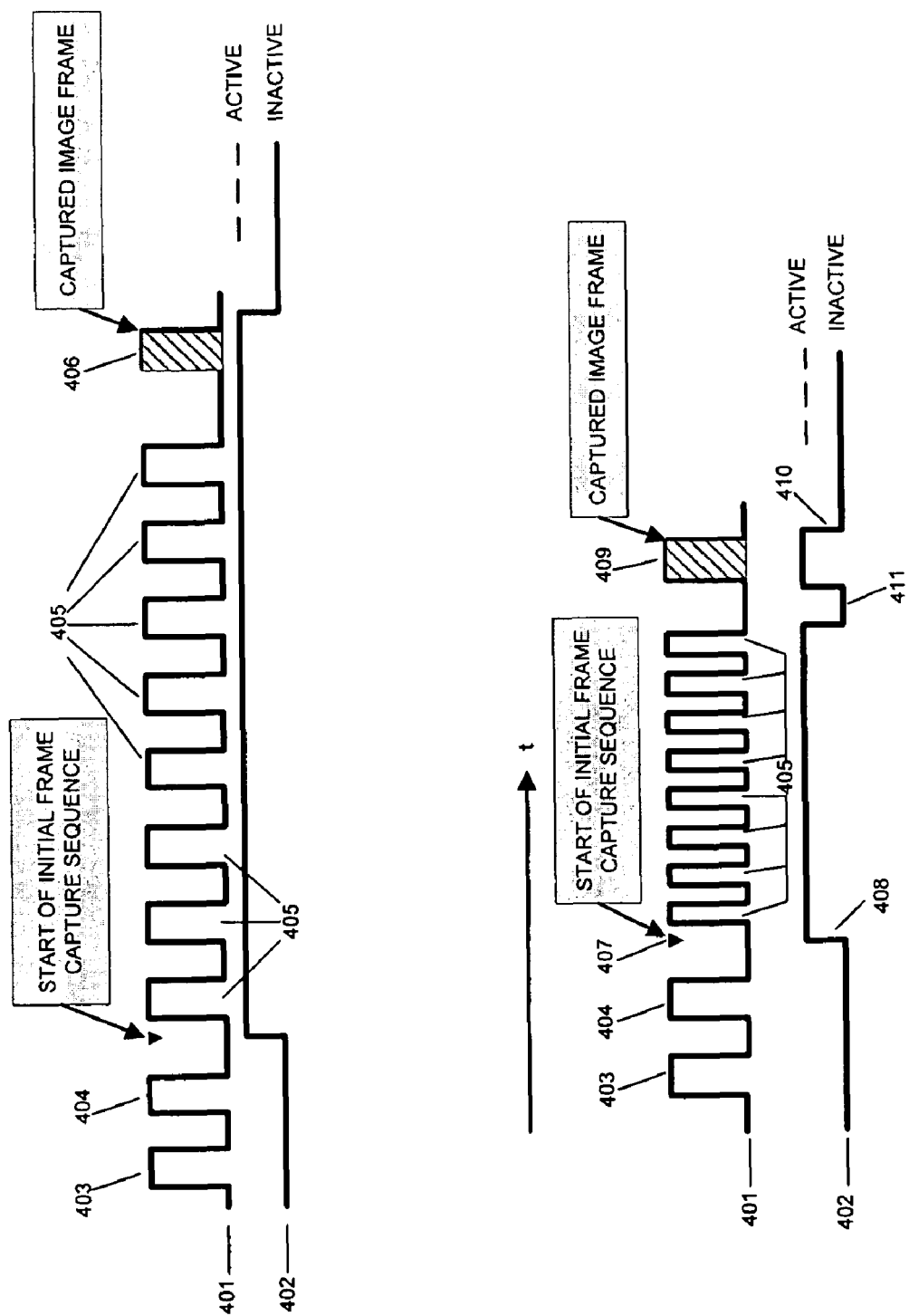
FIGS. 4A and 4B show a schematic representation of the timing of a capturing of frames and an activation of a flash unit for a system operating with an operating frame rate and a system operating with a faster initial frame rate according to an embodiment of the invention, respectively.

Referring to FIGS. 4A and B, curve 401 shows the capturing of frames, while curve 402 shows the activation of the flash unit. The curves are plotted as a function of time and show points in time between which frames are captured or the flash unit is activated. In FIG. 4A, curve sections 403 and 404 indicate the capturing of frames in flash mode at an operating frame rate. These frames may, for example, be displayed to a user of the mobile device for aiming purposes.

In FIG. 4A, after the user pressing the release, a predetermined number of initial frames 405 is captured. These may be used for determining exposure parameters, such as exposure time, gain, aperture, white balance and the like. These parameters may for example be adjusted during the capturing of the frames 405, so that as good as possible exposure conditions are obtained after capturing the last initial frame. Afterwards, image frame 406 may be captured, which corresponds to the actual photograph. As can be seen on curve 402, the flash unit may be activated during the capturing of the initial frames and the image frame. As the frames 405 are captured at the operating frame rate which is relatively low, the flash unit may be activated for a corresponding long period of time.

The embodiment of FIG. 3 is illustrated in FIG. 4B. After capturing frames 403 and 404 at the relatively slow operating frame rate, the capture sequence is started at time point 407. In step 302, the frame rate may be increased by a predetermined factor. In the next step 303, the flash unit may be activated. Activation of the flash unit is indicated with reference numeral 408 in FIG. 4B.

In step 304, a predetermined number of initial frames may be captured. The time required to capture these initial frames 405 may be shorter than the time required to capture the initial frames 405 in FIG. 4A. In this example, eight initial frames are captured, yet other numbers are also possible, for example, within a range of from about 3 to about 15.

In the next step 305, an image frame 409 may be captured. The flash unit may be deactivated in step 306, as indicated by reference numeral 410 in FIG. 4B. As indicated in FIG. 4B, the flash unit may also be deactivated for a time period 411, between the capturing of the last initial frame and the capturing of the image frame.

As can be seen, by using the method of the embodiment described with respect to FIG. 3, the time during which an activation of the flash unit is required is significantly reduced as compared to the capture sequence of FIG. 4A. An overheating of the flash unit and a disturbance of the persons being photographed can thus be prevented. After capturing the image frame, the image frame may be processed, e.g., using image processor 141, and displayed to the user of mobile device 100 on a display, such as display 123.

Figure 5:
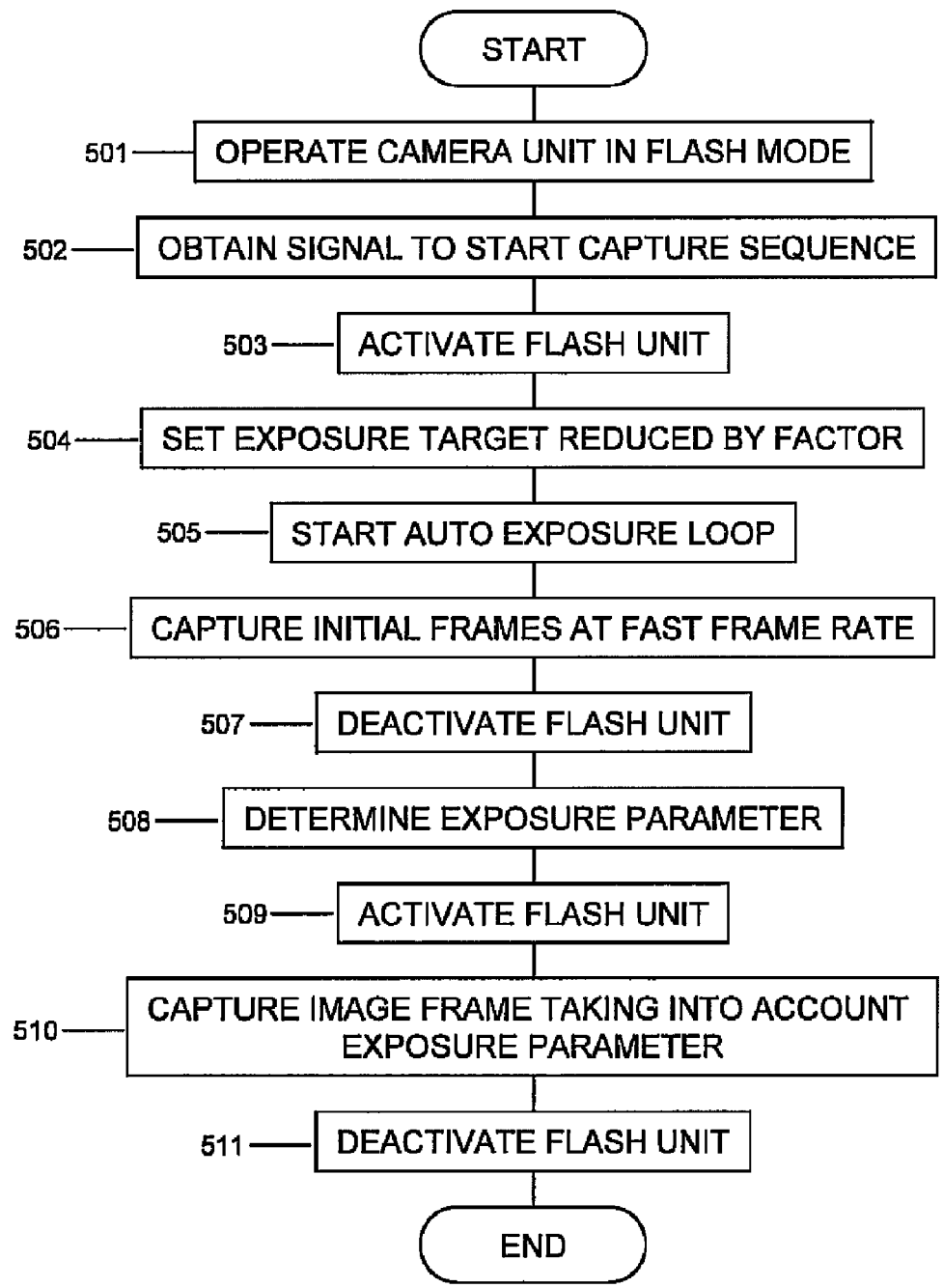
FIG. 5 shows another flow diagram of a method of capturing an image with a mobile device according to another embodiment of the invention.

With respect to FIG. 5, another embodiment of the method according to the invention is illustrated. The flow diagram of FIG. 5 shows a first step 501, in which the camera unit is operated in a flash mode, in which frames may be captured at an operating frame rate. In step 502, a signal may be obtained to start a capturing sequence. Such a signal may be obtained from a release activated by a user. In a next step 503, a flash unit is activated.

A camera unit is generally operated with respect to an associated exposure target, which is used to adjust exposure parameters so that an image acquired with the camera unit has an appropriate brightness. Such an exposure target may, for example, be manually adjusted to achieve underexposure or overexposure. To meet the exposure target, exposure parameters such as exposure time (shutter speed) or aperture, if available, may be adjusted. In step 504, the exposure target may be reduced by a predetermined factor. As the associated exposure target is reduced, the corresponding exposure time can also be reduced to meet the target.

In a next step 505, an auto exposure loop may be started. During the auto exposure loop, initial frames may be captured at a fast frame rate in step 506. An auto exposure loop is used to determine an exposure parameter, which may be varied over subsequent initial frames to meet the exposure target.

Due to the reduced exposure target and the resulting reduced exposure time, it is possible to acquire the initial frames at a frame rate higher than the frame rate that has to be used for acquiring frames without a reduction of the exposure target. This can also be seen from FIG. 4A, where the maximum possible exposure time is twice as long as the maximum possible exposure time in FIG. 4B for the initial frames 405. It should be noted that the maximum exposure time may be selectively reduced by a factor such that it is still possible to derive useful information from the frames acquired with the image sensor.

In step 507, the flash unit may be deactivated. An exposure parameter may be determined in step 508 on the basis of the initial frames captured and the predetermined factor. In step 509, the flash unit may be activated and an image frame may be captured in step 510. When capturing the image frame, the determined exposure parameter is taken into account. It should be clear that more than one exposure parameter may be determined in step 508, and may be taken into account in step 510. An exposure parameter may, for example, be at least one parameter selected from the group of exposure time, gain, aperture, and white balance.

In step 511, the flash unit may be deactivated, after which the method is ended. The captured image may then be further processed, using any of the methods of image processing known to a person skilled in the art. The image may be stored or displayed to a user.

Figure 6:
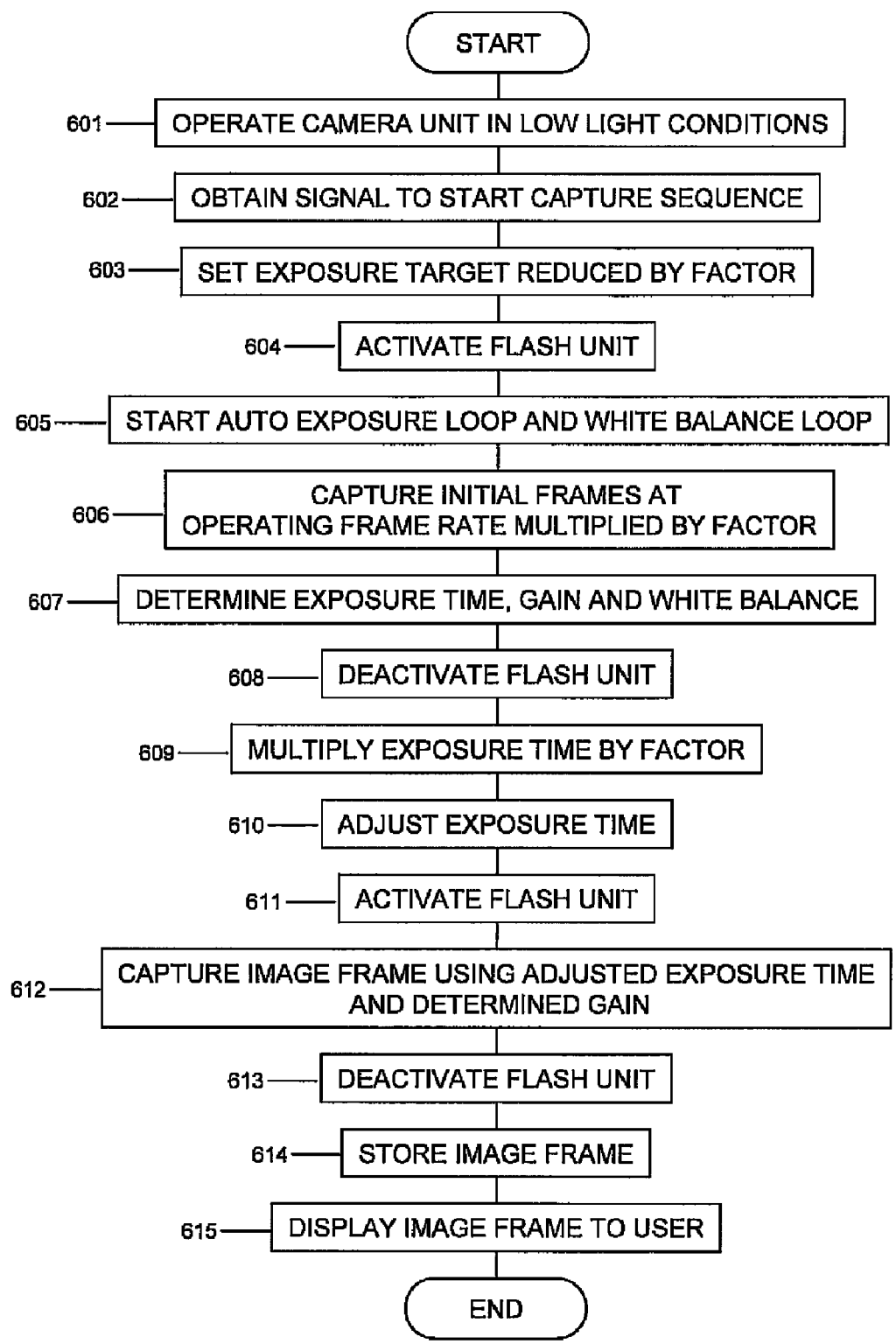
FIG. 6 shows a flow diagram of a method of capturing an image with a mobile device according to yet another embodiment of the invention.

FIG. 6 shows a flow diagram illustrating another embodiment of the method according to the invention. In step 601, a camera unit may be operated in low light conditions at an operating frame rate. The operating frame rate may, for example, be determined by a maximum exposure time, which may be set so that motion blur does not become too prevailant. To enable the image sensor to collect enough light for producing an image, the camera unit may generally run close to the maximum exposure time, and accordingly, at the corresponding low maximum frame rate.

In step 602, a signal to start a capture sequence may be obtained, e.g., from a release button by a user. In step 603, an exposure target for capturing an image frame, using which the camera unit is being operated, may be reduced by a predetermined factor. The flash unit may be activated in step 604.

In step 605, auto exposure and auto white balance loops may be started. During these loops, initial frames may be captured at the operating frame rate multiplied by said predetermined factor in step 606. During the auto exposure loop, exposure may stabilize at a level determined by the exposure target. After stabilization, the exposure time, sensor gain, and white balance may be determined in step 607. The determination of sensor gains may not be necessary, as it may be set to a maximum value in low light conditions. In step 608, the flash may again be deactivated.

Due to the reduced exposure target, the initial frames may generally be too dark, and accordingly, the determined exposure parameters may not be suitable for capturing an image frame. To account for the reduced exposure target, the exposure time may be multiplied by said predetermined factor in step 609. Using the adjusted exposure time may then result in an image with an exposure corresponding to the original exposure target. As an example only, the frame rate may be tripled during the auto exposure and auto white balance loop, and accordingly, the exposure target may be divided by three. The exposure time determined by using the reduced exposure target may then again be tripled for the capturing of the image frame, so that the image will be correctly exposed.

In step 610, the exposure time and/or the shutter speed may be adjusted in the camera unit. Such an adjustment may take a certain length of time, and accordingly, it may be beneficial to deactivate the flash during the adjustment. The flash may be activated in step 611 and an image frame may be captured in step 612 using the adjusted exposure time, and if applicable the determined gain. The flash may then again be deactivated in step 613. The captured image frame may furthermore be processed and stored in step 614. The image frame may be stored in a volatile memory of the camera unit and/or of a mobile device, e.g., in a RAM, or it may be stored in a non-volatile memory, such as a flash memory card and the like. In step 615, the image frame may be displayed to a user, for example, on a display of a mobile device having the camera unit.

Those skilled in the art will appreciate that the steps explained with respect to FIGS. 3, 5, and 6 may be combined. For example the method of FIG. 3 may also include a step of adjusting an exposure time or shutter speed and/or the steps of deactivating and reactivating the flash unit between the capturing of the initial frames and the capturing of the image frame. It should also be clear that the described methods may be implemented in any of the above-mentioned devices, such as a mobile communication device, a camera, a cellular phone, and other electronic devices.

Further, the present invention applies to any device that includes an image capturing unit and a flash unit. The present invention is thus not limited to the configuration shown in FIGS. 1 and 2 or mentioned in the description. With respect to FIG. 1, the device may, for example, not include an audio processing unit 114, as well as a microphone 124, and/or a loudspeaker 125, and it may not include a lens control 143 and a transceiver 112, yet it may include other units such as a global positioning system (GPS) unit for determining a position, additional control elements and so forth. Components shown in FIG. 1 may also be integrated into a specially designed application specific integrated circuit (ASIC), which may, for example, incorporate microprocessor 131, audio processing unit 114, image processor 141, and/or I/O unit 132.

While specific embodiments of the invention are disclosed herein, various changes and modifications can be made without departing from the spirit and the scope of the invention. The present embodiments are to be considered in all respect as illustrative and non-restrictive, and all changes coming within the meaning and equivalency range of the appended claims are intended to be embraced therein.

What is claimed is:

1. In a device including an image capturing unit and a flash unit, a method comprising:
   operating the image capturing unit in a flash mode at an operating frame rate;
   capturing a number of frames at a first frame rate that is greater than said operating frame rate; and
   capturing at least one image frame,
   wherein the flash unit is deactivated for a period of time between the capturing of the number of frames and the capturing of the at least one image frame, and
   wherein the flash unit is activated during the capturing of the number of frames and the capturing of the at least one image frame.

2. The method of claim 1, wherein the capturing of the number of frames is used for determining an exposure time for capturing the at least one image frame.

3. The method of claim 1, wherein a first exposure target, on the basis of which an exposure is adjusted for capturing a frame, is different for the number of frames and a second exposure target for the at least one image frame.

4. The method of claim 3, wherein the first exposure target for the number of frames is a predetermined factor smaller than the second exposure target for the at least one image frame.

5. The method of claim 4, wherein said predetermined factor corresponds to a ratio of a first frame rate to the operating frame rate.

6. The method of claim 4, wherein said predetermined factor is used in determining an exposure time for said capturing of said at least one image frame.

7. The method of claim 1, further comprising:
   adjusting an exposure time for the at least one image frame between the capturing of the number of frames and the capturing of the at least one image frame.

8. The method of claim 1, wherein the capturing of the number of frames is used for determining at least one parameter selected from the group of white balance, gain, and aperture.

9. The method of claim 5, wherein said predetermined factor is within a range of from about 2 to about 8.

10. The method of claim 1, wherein an initial frame rate is within a range of from about 10 to about 40 frames per second.

11. The method of claim 1, wherein between 3 and 15 initial frames are captured.

12. A method of capturing an image using a device having an image capturing unit and a flash unit, the image capturing unit being operable with an exposure target for capturing an image frame, the method comprising:
capturing a number of frames using the exposure target decreased by a predetermined factor;
determining an exposure parameter on the basis of the number of frames; and
capturing at least one image frame using the determined exposure parameter adjusted based on said predetermined factor, wherein said flash unit is activated during the capturing of the number of frames and the capturing of the at least one image frame.

13. The method of claim 12, wherein said image capturing unit is operated in a flash mode at an operating frame rate, and the number of frames are captured at an initial frame rate that is faster than said operating frame rate.

14. The method of claim 13, wherein said predetermined factor corresponds to a ratio of said initial frame rate to said operating frame rate.

15. The method of claim 12, wherein the exposure parameter comprises at least one parameter selected from the group of exposure time, gain, and aperture.

16. The method of claim 12, wherein the flash unit is deactivated for a period of time between the capturing of the number of frames and the capturing of the at least one image frame.

17. The method of claim 12, wherein said predetermined factor is within a range of from about 2 to about 8.

18. A mobile device comprising:
an image capturing unit to capture frames at least two different frame rates, the image capturing unit being configured to operate in a flash mode at an operating frame rate;
a flash unit; and
a control unit to cause said image capturing unit to capture a number of frames at an initial frame rate that is higher than said operating frame rate and to capture at least one image frame, the control unit being configured to activate the flash unit during the capturing of the number of frames and during the capturing of the at least one image frame, wherein the control unit is configured to deactivate the flash unit for a period of time between the capturing of the number of frames and the capturing of the at least one image frame.

19. The mobile device of claim 18, wherein the control unit is further configured to operate said image capturing unit based on an exposure target for capturing an image frame and based on said exposure target being decreased by a predetermined factor for capturing said number of frames.

20. The mobile device of claim 18, wherein the flash unit comprises at least one light emitting diode.

21. The mobile device of claim 18, wherein the mobile device comprises a communication device.

22. The mobile device of claim 18, wherein the mobile device is at least one of a personal data assistant, a personal navigation device, a cellular phone, a compact camera, a single lens reflex camera, a portable computer, a web camera, or a network camera.

23. In a device including an image capturing unit and a flash unit, a method comprising:
operating the image capturing unit in a flash mode at an operating frame rate;
capturing a number of frames at a first frame rate that is greater than said operating frame rate; and
capturing at least one image frame,
wherein the flash unit is activated during the capturing of the number of frames and the capturing of the at least one image frame,
wherein a first exposure target, on the basis of which an exposure is adjusted for capturing the number of frames, is a predetermined factor smaller than a second exposure target for the at least one image frame.

24. A mobile device comprising:
an image capturing unit to capture frames at least two different frame rates, the image capturing unit being configured to operate in a flash mode at an operating frame rate;
a flash unit; and
a control unit to:
cause said image capturing unit to capture a number of frames at an initial frame rate that is higher than said operating frame rate and to capture at least one image frame, the control unit being configured to activate the flash unit during the capturing of the number of frames and during the capturing of the at least one image frame, and
operate said image capturing unit based on an exposure target for capturing an image frame and based on said exposure target being decreased by a predetermined factor for capturing said number of frames.

25. A mobile device comprising:
an image capturing unit operable with an exposure target for capturing an image frame;
a flash unit; and
a control unit to:
capture a number of frames using the exposure target decreased by a predetermined factor,
determine an exposure parameter on the basis of the number of frames, and
capture at least one image frame using the determined exposure parameter adjusted based on said predetermined factor,
wherein said flash unit is activated during the capturing of the number of frames and the capturing of the at least one image frame.

* * * * *